BINARY QUANTIZER

Filed May 26, 1950 3 Sheets-Sheet 1

INVENTOR
KAY HOWARD BARNEY
BY Paul B. Hunter
ATTORNEY

Aug. 16, 1955 K. H. BARNEY 2,715,678

BINARY QUANTIZER

Filed May 26, 1950 3 Sheets-Sheet 2

INVENTOR
KAY HOWARD BARNEY
BY
Paul B. Hunter
ATTORNEY

INVENTOR
KAY HOWARD BARNEY
BY Paul B. Hunter
ATTORNEY

United States Patent Office 2,715,678

Patented Aug. 16, 1955

2,715,678

BINARY QUANTIZER

Kay Howard Barney, Great Neck, N. Y.

Application May 26, 1950, Serial No. 164,530

7 Claims. (Cl. 250—27)

This invention relates to electronic counting means and more particularly to means for converting a varying input quantity into digital form.

The invention is entitled a binary quantizer as it measures an input quantity in discrete steps i. e., in numbers, and its output is in binary numbers i. e., numbers based on a scale of two. There are only two binary digits, 0 and 1.

The art of servo mechanisms and mechanical and electronic computing devices has been greatly advanced in recent years. There are two general types of computers, analogue and digital. The term "analogue" derives from the fact that for each function to be performed, there is built into the computer a continuous measurement mechanical or electrical analogous member, for instance, a sine or cosine cam, or a differential.

Digital computers measure in discrete steps i. e., they count. The simplest digital computer is the human hand from which is derived the decimal system. An interesting background article on the general subject matter of computers appears in the April 1949 Scientific American.

One of the more difficult problems in analogue computers is that of multiplication when the input quantities, for instance shaft rotations, are continually varying, However, if these quantities could be converted into numbers, that is integral quantities varying only in discrete steps, then the multiplication would be greatly simplified. One approach to the multiplication problem is to continuously and simultaneously translate the physical quantity into a number composed of integral quantities, that is, quantize it, then multiply the numbers in a high speed digital multiplier and then retranslate or dequantize the product into the physical data of the analogue system.

The present invention provides a device which greatly facilitates this operation. The binary quantizer of the present invention provides means for translating the time varying quantities or voltages, such as appear in an analogue computer, into discrete binary numbers which are directly proportional to the instantaneous value of the quantities being measured. Therefore, the present invention makes possible digital techniques in an analogue computer. The present invention bridges the gap between the two types of computer techniques thereby enabling the use of the best portions of each technique in combination. The present invention therefore opens up a new realm of design possibilities of computing mechanisms.

For example, consider two computer shafts carrying different quantities. A voltage may be generated proportional to each shaft rotation, then each voltage is quantized into digital form and multiplied in a high speed digital multiplier. The product is then dequantized as taught hereafter. This procedure avoids the use of relatively slow, analogue multipliers such as the sliding cross bar type.

Accordingly, a principal object of the invention is to convert a varying quantity into digital form.

Another object of the invention is to convert analogue data to digital data so that a varying input quantity may be converted into instantaneous numerical values.

Another object of the invention is to convert an input quantity into a binary number.

Another object of the invention is to convert a varying voltage into a voltage measured in integers.

Another object of the invention is to quantize an input voltage or other quantity.

Another object of the invention is to provide means for translating quantative information into a form suitable for digital computers.

Another object of the invention is to provide a binary counter which will count forward and backward responsive to a comparison between the counter output and an input quantity.

Another object of the invention is to provide electrical data which is suitable for a digital multiplier.

Another object of the invention is to translate or quantize the physical quantities of an analogue computer into reversible binary numbers suitable for easy multiplication.

Another object of the invention is to synthesize a voltage in accordance with a predetermined function.

Another object of the invention is to provide means to translate the time varying voltages in an analogue computer into discrete binary numbers directly proportional to the instantaneous value of the input quantity.

Another object of the invention is to make possible digital techniques in any analogue computer.

Another object of the invention is to provide means to differentiate a varying function.

Another object of the invention is to provide pulses having spacing and polarity proportional to the derivative of an input quantity.

These and other objects of the invention will be apparent from the following description and figures of which:

Figure 6:
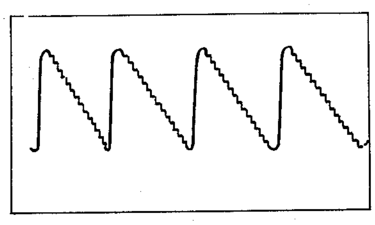
Figure 7:
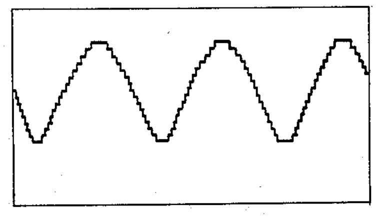
Figure 8:
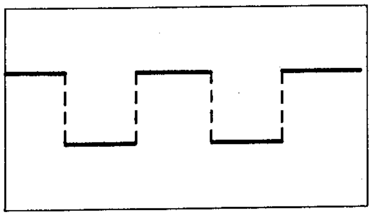
Figure 10:
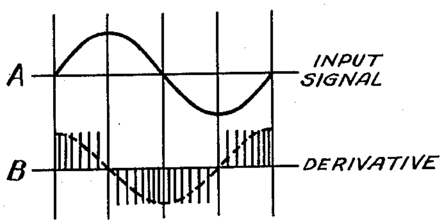
Figure 9:
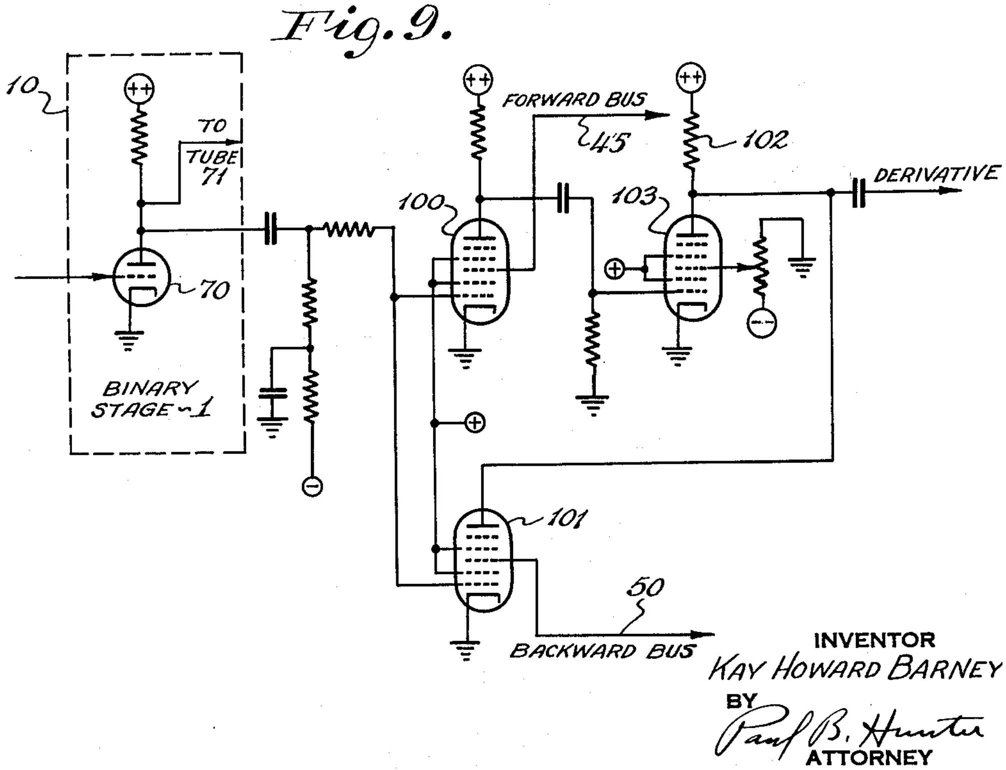

Figs. 6, 7, and 8 are waveforms illustrative of the operation of the binary quantizer;

Fig. 9 is a differentiator circuit adapted to be used with the binary quantizer; and Fig. 10 comprises two waveforms illustrative of the operation of the differentiator of Fig. 9.

The present invention provides means for translating or quantizing the instantaneous value of a time varying quantity into a binary number.

The invention features a binary counter composed of a series of flip flop trigger circuits. The counter employs feedback to count either forward or backward in response to the difference between the instantaneous amplitude of the input signal and the output of the counter. The feed back voltage is a synthesized voltage proportional to the output binary count at any instant of time.

The present invention may be used for computing work by translation between analogue and digital data, or wherever the quantizing of a continuously varying function is desired, for instance, in pulse code modulators, automatic measuring devices and recording devices employing typed or printed numbers.

Figure 1:
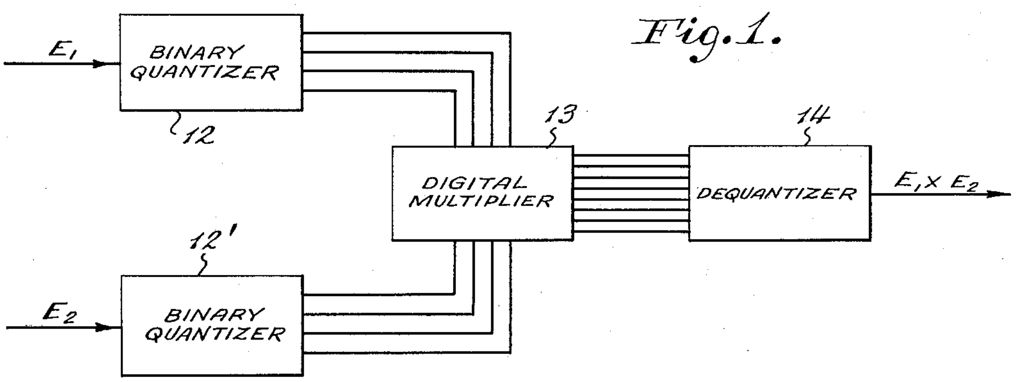
Fig. 1 is a block diagram illustrative of one use of the invention.

Fig. 1 illustrates one use of the present invention. In Fig. 1 two input quantities are translated into numbers with two binary quantizers 12 and 12' of the present invention. The binary outputs may then be multiplied in a digital multiplier 13, which is a well known device outside the scope of the present invention. Several multipliers are described in the above-mentioned Scientific American article. If it is desired to return the product of these numbers to the analogue type data this may be done in a dequantizer circuit 14. Fig. 1 illustrates how analogue quantities may be converted to digital quantities by means of the present invention.

The dequantizing circuit 14 synthesizes a varying voltage quantity from its binary version. This may be done by using the feedback circuit of the quantizer in reverse as will be discussed hereinafter.

The present invention uses a reversible binary counting circuit consisting of a plurality of cascaded flip flop, Eccles-Jordan type circuits in which the count may be made to progress either forward or backward. To the counter output is attached a voltage feedback circuit which produces a synthesized voltage proportional to the count registered on the counter at any instant of time. This feedback signal is used to oppose the original input signal, i. e., the one translated to binary digits. When a difference exists between the input and the feedback voltages, the counter is operated in a direction controlled by the polarity of this different or error voltage. The counter will then count until no difference appears between the input and feedback voltages. At this time the counting stops, and the counter awaits any new change in the input signal.

*The principle of forward and backward counting*

Figure 2:
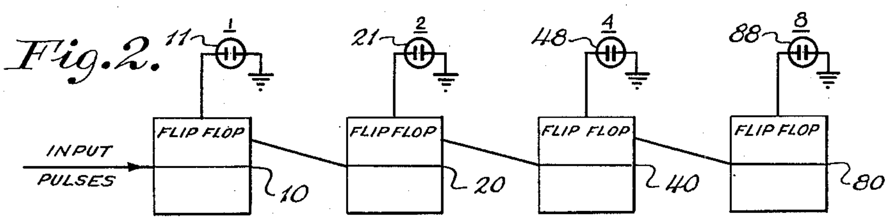
Fig. 2 is a block diagram illustrative of a forward binary counter.

The usual binary counter consists essentially of the circuit of Fig. 2. This shows a set of flip flop circuits 10, 20, 40, and 80, each having a pair of triodes connected so that the plate of one triode of the first flip flop stage is connected to the input circuit of the following flip flop stage, etc. Each flip flop itself is shown as two boxes, each of which represents one of the triodes. The numerical value of the count in binary form is indicated by the neon bulbs 11, 21, 48, and 88, the binary digit 1, being registered when the lamp is "on" and the other binary digit 0, when the lamp is "off." Each flip flop bears the coefficient 1, 2, 4, or 8, as indicated in the diagram. Thus, if the lamps on stages 20 and 40 were "on" a total of six pulses would be registered.

To understand the operation of this counter, it must be kept in mind that the flip flop circuits change position, that is, from one stable state to the other, upon the receipt of negative pulses only. This last statement is very important.

The operation of this flip flop chain may be explained by the following example. Consider the count standing initially at zero, that is, all neon lamps "off." Upon the receipt of the first pulse, the first flip flop stage 10 changes to its other stable state, the plate connected to the neon bulb goes positive, and the lamp lights, indicating the number, 0001=1. This also sends a positive pulse to stage 20, but since only negative pulses can change its position, as emphasized above, nothing further happens. The next input pulse again changes the position of stage 10 which, as the lamp is extinguished, sends a negative pulse to stage 20, causing it to change to its other stable position lighting its lamp 21 indicating the number 0010=2. Since stage 20 emits a positive pulse, stage 40 is unaffected and again the counter stands at rest. The next input pulse again changes stage 10 so that its lamp again lights and it emits a positive pulse which does not affect stage number 20. The count now stands at 0011=3. In this manner, the circuit counts the input pulses in the forward direction until the number 1111=15 is reached. Then the next pulse will reset the counter to 0000 and the count will again progress forward. The number of stages may be increased indefinitely, each new stage doubling the numerical capacity.

Figure 3:
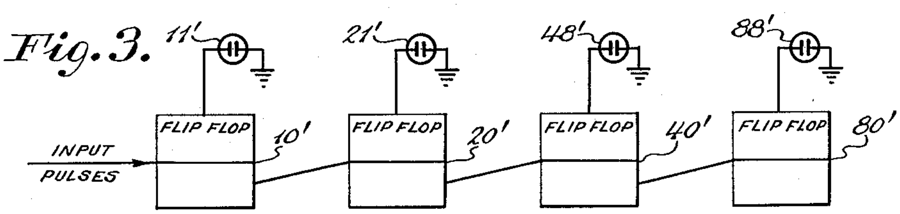
Fig. 3 is a block diagram illustrative of a backward binary counter.

The circuit of Fig. 3 is identical with that of Fig. 2 except the connections are changed so that the stage following each flip flop is triggered by the output of the triode plate to which there is no neon bulb attached. This reverses the output polarity with respect to the operation of the neon lamp. Therefore, when a neon lamp goes out the output of its stage is positive. As emphasized before, only negative pulses will trigger the flip flop circuits.

Assume that the count on Fig. 3 stands at 0011=3, that is, the bulbs of stages 10 and 20 are lit. The first input pulse received changes the position of stage 10, but since negative pulses alone affect the following stage, the lamp 11 is merely extinguished on stage 10, and the count stands at 0010=2. The next input pulse lights the lamp 11 of stage 10 and agains drives the opposite plate of this flip flop from positive to negative, causing a negative pulse which triggers the stage 20 and extinguishes its lamp 21. The count is now at 0001=1. The next input pulse changes stage 10 again and extinguishes its lamp. Now the count is 0000. The next pulse will place the counter at 1111, and the counter will continue to count down from there. Thus it can be seen that the direction of the count of the binary stages may be reversed by switching all the interstage connections.

*The operation of the quantizer*

Figure 4:
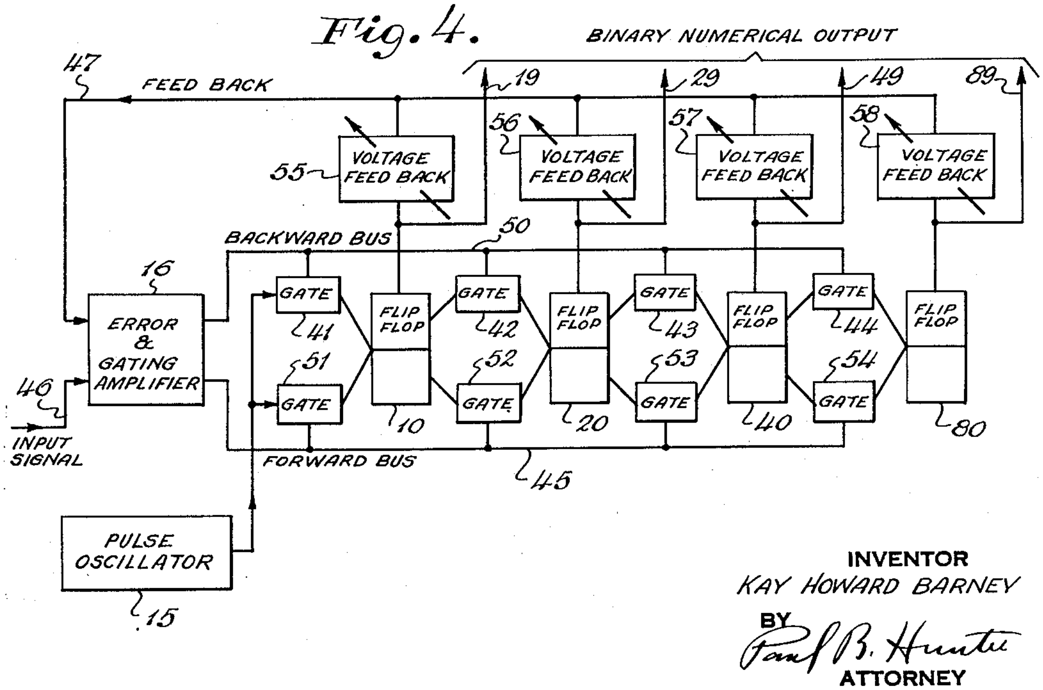
Fig. 4 is a block diagram of one embodiment of the reversible binary quantizer of the present invention.

The application of this principle is shown in the block diagram of the quantizer, Fig. 4. Fig. 4 comprises a series of flip flop circuits 10, 20, 40 and 80, which may be of the Eccles-Jordan type. The properties of these circuits are well known and their virtue lies in the fact that they have two stable conditions of operation. When the conditions are changed the circuit will go rapidly to the other condition of operation. The circuit cannot operate in a balanced condition. Its quiescent state is always one of its two bi-stable conditions.

The flip flop circuits are connected in cascade by a series of connecting gates which operate as switches. All the forward gates 51, 52, 53 and 54 are connected to the forward bus 45. When the forward bus is energized by the error and gating amplifier 16 the trigger circuits are connected through the forward gates to count in a forward direction as in Fig. 2. The backward gates 41, 42, 43 and 44 are all connected to the backward bus 50 and when it is energized by the error amplifier 16 the trigger circuits are connected so as to count backwards as illustrated in Fig. 3. Pulses are continuously supplied to gates 41 and 51 by pulse oscillator 15. If there is no error the pulses will not be transmitted through either input gate.

The error signal is generated as follows: The input signal to be quantized is connected to input lead 46. A voltage proportional in amplitude to the total output of the counter is fed back from the output of the counter through feedback lead 47 to the error amplifier 16. The feedback voltage is composed of the total from each stage and the separate outputs are weighted according to their binary coefficient in voltage feedback circuits 55, 56, 57 and 58 as will be explained. The operation is as follows: The error signal, or the difference between the input signal and the feedback voltage representing the count standing on the counter, opens the forward or the backward gates, depending on the sign of the error as it is amplified through the error and gating amplifier 16. The counter will now respond to pulses from the oscillator 15 which operates continuously.

The voltage feedback circuits attached to each stage, are adjusted so that one unit of voltage is fed back from stage 10 when it indicates the digit, 1, and no voltage is fed back when it indicates the digit, 0. Likewise, stage 20 will feed back two units of voltage, stage number 40, four units, and stage number 8, eight units when they stand at 1, and no voltage when they stand at 0. The sum of the voltages fed back at any instant of time is compared to the input signal through a feedback network in error amplifier 16.

The binary numerical output of the quantizer appears as a combination of voltages on the wires 19, 29, 49 and 89, a ground indicating the digit 1, and a minus voltage indicating the digit 0.

In the actual circuit the voltage feedback unit 55 etc. may be a pentagrid converter-type tube which is cut off when the binary stage stands at 0, and which conducts a current proportional to the binary value of the stage to which it is connected when that stage stands at 1. When conducting, the feedback circuit 55 of stage 10 will pass one unit of current, that of stage 20, two units of current, that of stage 40, four units, and so on. The plate currents of all the feedback tubes are added in a common plate-load resistor. The voltage drop across this common resistor (84, Fig. 5) at any time, will be proportional to the count standing on the counter at that time. It is this synthesized voltage that is compared with the input signal. If a positive error appears, the forward bus goes to ground potential permitting operation of the forward gates which allow the counter to count forward. Likewise, a negative error causes the backward bus to go to ground potential, allowing the count to progress backwards. Thus, as the block diagram indicates, the counter counts only when the input signal changes, and the numbers "follow" the instantaneous amplitude of the input signal, forward or backward.

Figure 5:
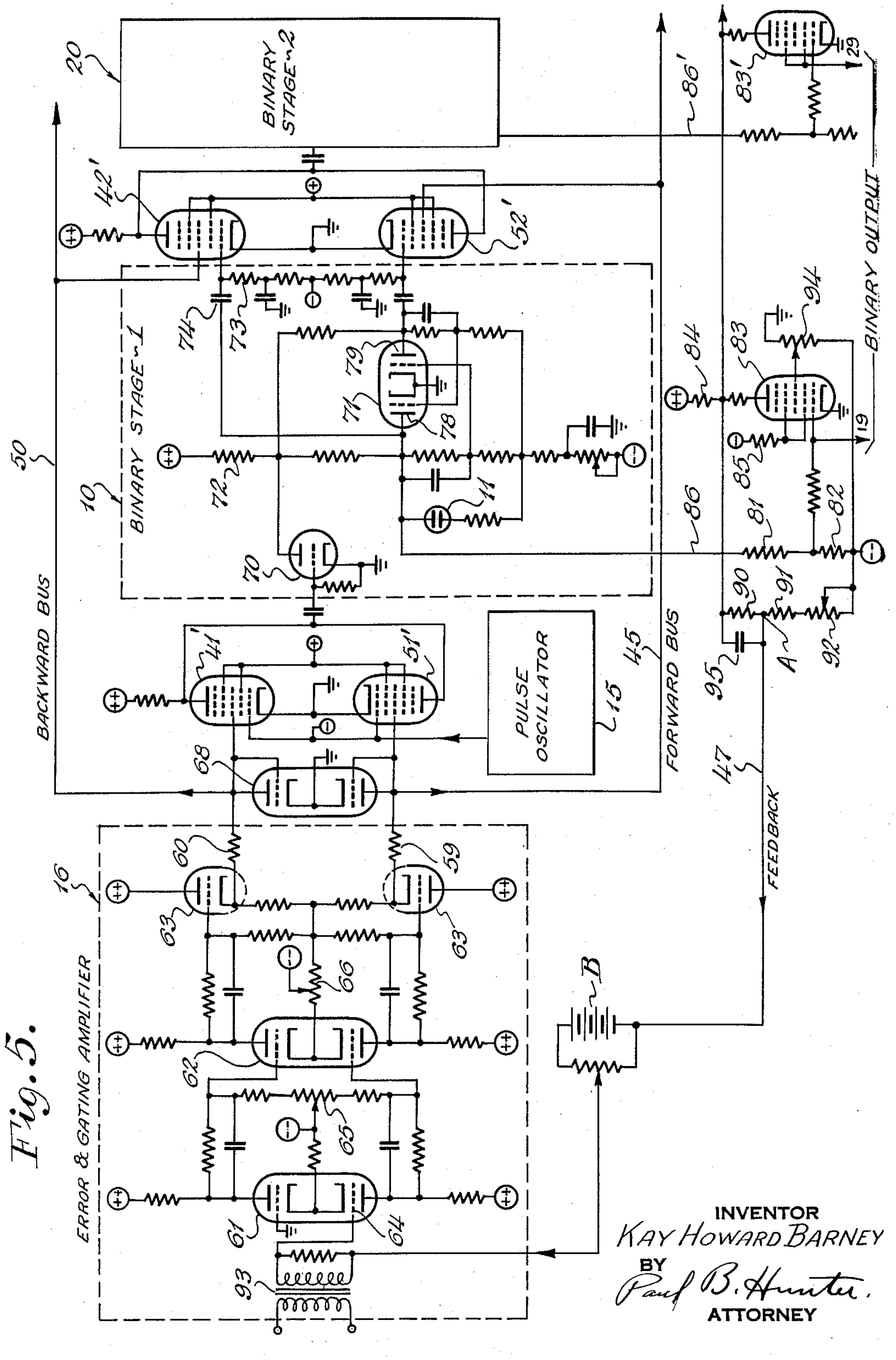
Fig. 5 is a schematic diagram of the binary quantizer.

As the schematic diagram, Fig. 5, indicates, the actual circuits used in the binary quantizer are quite conventional. The schematic diagram, Fig. 5, shows all the circuits including the first binary counting stage. The following binary stages 20, 40, 80 etc. although not shown in this diagram are identical to the first one in all respects. In the illustrative specific embodiment of Fig. 5, the circuits are constructed entirely for use with miniature tubes, three types being employed 6J6 (duo-triode), 6BE6 (pentagrid converter), and the 12AU7 (duo-triode). Three voltage sources are required, 200 volts, indicated by (++), 100 volts (+), and —125 (——) volts, from which a fourth voltage of —14 (—) volts is obtained by means of a bleeder circuit. The filament supply may be the usual 6.3 volts, alternating current. All power supplies save that of the filament must be well regulated. For the tubes mentioned the 200-volt and the 100-volt supplies have current drains of about 75 milliamperes maximum. The 125-volt source must supply about 50 milliamperes.

The error and gating amplifier 16 is an ordinary direct-coupled push-pull amplifier which may use two 6J6 duo triode tubes 61 and 62 as amplifiers and a 12AU7 duo triode tube 63 for a cathode follower output. One of the grids of the input tube to this amplifier 16 is grounded so that the error signal is measured with respect to ground.

The amplifier 16 is adjusted by temporarily grounding the other input grid 64, simulating zero error, and then adjusting the balancing control 65 and bias level control 66 until both output leads connected to resistors 59 and 60 are at the same negative potential, say about —25 volts. These output leads are attached through resistors 59 and 60 to the forward and backward busses 45 and 50. Also attached to each bus is one-half of a 12AU7 tube 68 connected as a diode. These diodes act as limiters to prevent the bus voltage from exceeding ground potential in a positive direction, thus ensuring proper operation of the gating circuits regardless of the magnitude of the error signal.

The exact setting of the level control 66 is obtained when the feed-back voltage from an error of one unit causes the forward or backward bus to go to ground potential. The response of the error and gating amplifier 16 in a specific embodiment has been found substantially flat from zero to approximately 270 kc. per second. This frequency response permits satisfactory detection of the error signal when a counting rate of 250 kc. per second is used.

The output of pulse oscillator 15 is applied to the gate tubes 41' and 51'. This pulse signal in the positive direction is sufficient to overdrive these input gate tubes. The input gating circuit 41' and 51', are identical to the rest of the gating circuits, and may consist of 6BE6 pentagrid converter tubes. To the first grid is fed the output of the pulse oscillator 15. The grid is biased at cutoff (—14 volts) so that only positive signals will be amplified. The third grid is attached to the forward or backward bus, both of which will be at a potential of —25 volts when there is no error signal. With the appearance of an error, the forward or backward bus will be energized and go to ground potential permitting the operation of all the forward or backward gates.

With the counter in operation the output of the input gate consists of negative pulses which are amplified and inverted by the 6J6 trigger tube 70 preceding the first flip flop 71. The output of the trigger tube appears as positive pulses across the resistor 72.

The flip flop circuits 71 consist of two triode halves of a 6J6 tube connected in a standard Eccles-Jordan bi-stable circuit, this is, the plate of one triode is directly coupled by means of a voltage divider to the grid of the other. This circuit will have two stable conditions: one triode conducting and the other triode cut off; or vice versa. The input positive pulse appearing across the resistor 72 will be coupled to the grids of both triodes. This pulse will have little effect on the grid of the conducting triode. On the other hand, this positive pulse will bring the cut-off triode into conduction. The rise of voltage on the grid of the formerly cutoff tube is amplified and inverted and coupled to the other conducting triode driving it rapidly into cutoff. When this has occurred, the circuit will remain at rest with the originally cut off triode conducting and the other cut off. These conditions will be reversed again when another positive pulse from the trigger tube 70 is received across the resistor 72. When the counter is in continuous operation, the voltage wave form on each of the plates of the triodes comprising the flip flop will be approximately square.

This square wave is differentiated by the coupling resistor 73 and capacitor 74 combination and the resulting pips are applied to the succeeding gate circuit. One or the other of the gating tubes 42' or 52' depending upon the direction of the count will amplify the positive portion of this signal which is again differentiated and applied to the trigger tube of flip flop 20. All the flip flop binary stages are identical and an indefinite number may be used. Therefore, only one is shown in detail.

As the preceding section on "Principle of forward and backward counting" indicated, the flip flop circuits (in cluding the input trigger tube 70) must be triggered by a negative pulse only. The rule is; to count in a forward direction, this negative pulse must appear at the input of the following flip flop 20 at the same time that the neon bulb 11 attached to the first flip flop 10 is extinguished. Since the gating circuits invert the signal and operate on positive signals only, to count forward, the plate 79 of the triode to which there is no neon bulb attached must be connected through the gating circuits to the trigger tube of the following flip flop.

Assume now that the neon bulb of stage 10 is lit. When stage 10 receives a pulse, the plate 78 connected to the neon bulb 11 changes potential in a negative-going direction, and bulb 11 goes out. At the same time the other plate 79 goes positive. It is this positive pulse that is amplified and inverted by the gate 52' attached to the forward bus 45 giving the required negative input pulse to the input of next stage 20.

Upon receiving another pulse, stage 10 again changes to its other stable state, its neon bulb lights and the plate 79 attached to the forward gate 52' drops in potential. As negative going pulses are not amplified by the gating tube 52′, there will be no signal applied to the trigger tube similar to 70, of stage 20. This fulfills the conditions for forward counting. Backward counting also may be demonstrated in a like manner, as illustrated in Fig. 3. The gate tubes like 42′ connected to the back bus 50 make the connections of Fig. 3.

The feedback circuit illustrated schematically in the lower portion of Fig. 5 operates as follows:

A voltage divider consisting of series resistors 81 and 82 is connected between the multivibrator triode plate 78 and a −125 volt source. A neon bulb 11 is also connected to the multivibrator plate 78. The junction of series resistors 81 and 82 is connected to the first grid of a feedback amplifier 83. The values of resistors 81 and 82 are such that when the neon bulb 11 is "off," the first stage feedback amplifier 83 is cut off. When the neon bulb is "on," the plate current of the feedback amplifier is controlled by the potential on the third grid of the 6BE6 tube 83 as set by digit adjustment 94. The screen current is limited to a safe value by the resistor 85.

The plate currents of all the feedback amplifiers flow through the common resistor 84. The voltage across this resistor 84 is directly coupled by the voltage divider, consisting of resistors 90, 91 and 92, to the input transformer 93 and thence to the input of the error and gating amplifier 16. Any change in input signal is thus added in series with the feedback voltage. Coupling circuits other than transformers may be adapted for use here and the input signal combined with the feedback signal in any suitable manner.

When the count stands at zero, the zero level adjustment 92 is adjusted so that the junction of the resistors 90 and 91 (junction A) is at ground potential. Then, with the neon bulb 11 of stage 10 "on," the digit feedback adjustment 94 is adjusted to give −2 volts at junction A. In a like manner, the digit feedback adjustment (not shown) of stage 20 is adjusted to give −4 volts at junction A when neon bulb of stage 20 is "on" and the rest are "off." Similarly, stage 40 is adjusted to give −8 volts and stage 80 to give −16 volts. In one embodiment of the present invention the amplifying circuits have been found to operate satisfactorily with these potentials.

To allow quantization of signals having both positive and negative values the quantizer is "biased" to the number seven by the battery B. Then signals applied through the input transformer 93 will be quantized using the numbers from zero to seven for the negative portion of the signal and the numbers 8 to 15 for the positive portion of the signal. A capacitor 95 is connected from junction A across the resistor 90 to compensate for the shunt capacities to ground of the transformer and other circuit components. The neon bulbs have been used in the counter circuits to aid the adjustment of the counter and for demonstration purposes only, as the useful numerical output will consist of the combination of voltages appearing at the grids of each of the feedback amplifier tubes and on the output leads 19, 29 etc. The feedback tubes may be adjusted or modulated to introduce another function into the counter output, if desired.

As any drift in the circuit parameters of the components forming the feedback circuit will be manifested in digital output as discrete steps, small changes will not be registered. During the warm-up period the zero level adjustment 92 must occasionally be adjusted to keep junction A at zero potential when the count stands at zero. The feedback amplifier tubes should be stable in operation to insure accuracy of the quantizer output. Satisfactory operation has been obtained for considerable periods of time without any adjustment except that of the initial zero level adjustment 92.

The stability of the quantizer operating as a closed loop system may be analyzed on the basis of two considerations. First, the amplifiers and the feedback system must be capable of determining within the period of time between pulses from the oscillator that an error has been corrected. In the embodiment of the quantizer described, it was found that a flat response from zero to approximately 270 kc. per second was satisfactory when a counting rate of 250 kc. per second is used.

The second consideration involves the operation of the quantizer when the instantaneous amplitude of the input signal is not equal to an integral number of feedback voltage units. At first glance it might appear that a signal amplitude halfway between the amplitude of two possible levels of the feedback voltage might cause the output of the counter to oscillate. However, because of the high gain of the error and gating amplifier and the fact that the counter operates only when the forward or the backward bus is within a volt of ground potential, there is a considerable dead zone between levels. This dead zone increases as the gain of the error and gating amplifier is increased providing that the bias level adjustment of the error and gating amplifier is always adjusted so that an error of one unit causes the forward or backward bus to go exactly to ground level.

The operation of the binary quantizer is further illustrated by Figs. 6, 7 and 8. These are waveforms of voltages appearing across the common plate-load resistor 84 of the feedback circuit. When the counter is allowed to run freely (as an open loop system), the wave form shown in Fig. 6 will be produced across this resistor. The height of each step is proportional to the count standing on the counter at that particular instant of time.

Fig. 7 shows the voltage across this common plate-load resistor when the input circuits are all connected and a sine wave is introduced at the input of the binary quantizer. Note that the feedback voltage is a quantized or synthesized replica of the input. Each step indicates that the counter has remained at rest at a particular number until the error betwen the input signal and the feedback voltage has exceeded a certain limit determined by the sensitivity of the error and gating amplifier. When this limit is exceeded, the count will be advanced by one pulse and the counter will again remain at rest until a large enough error appears. The numerical output appears as a combination of voltages of the leads labeled "binary output" in Figs. 4 and 5.

When excited by a square wave the binary quantizer will have the feedback voltage waveform shown in Fig. 8. This shows the counter counting up the sides of the square wave. At the top, the feedback voltage equals the signal voltage and the counter remains at rest until another change in input voltage occurs.

*The differentiating circuit*

When it becomes understood that the counting circuits of the binary quantizer function only when there is a change in the instantaneous amplitude of the input signal, a novel application of this device presents itself. The entire apparatus may be used to function as a differentiator circuit by the addition of the circuit of Fig. 9.

Whenever the machine is counting, positive pulses will appear at the plate of the trigger tube 70 of the first binary stage. In addition to being fed to the first stage of the binary counter these pulses are also used to drive the grids of tube 100 and tube 101 (of Fig. 9). If the counter is counting backward, tube 101 will be gated by its connection to the regular backward bus 50 and its output consisting of negative pulses of uniform height but spaced according to the rate of change i. e., the derivative of the input signal contained in the frequency of pulses, will then appear across resistor 102. Since the forward bus 45 is negative beyond cutoff at this time, there will be no output through tubes 100 and 103. However, should the counter count forward, positive pulses will again appear on the grids of tubes 100 and 102, but the forward bus will now gate tube 100 whose negative output is inverted by tube 103 to give a positive set of time-spaced pulses across resistor 102 whose spacing and sign are determined by the derivative of the input signal as shown in Fig. 10.

If it is assumed that an arbitrary and constant value of signal change is necessary to gate one pulse from the oscillator 15 to the quantizer, the frequency of pulses so gated will reflect the rate of change of the input signal. If the gated pulses are caused to be polarized in accordance with the sense of the change of input signal, the derivative of that input is represented by the average energy level of such pulses. This presumes, of course, that all such output pulses are of equal amplitude and the same duration.

Obviously means to produce a continuous wave output reflecting the average energy level and polarization of the pulsed output may readily be employed in accordance with the present invention. The derivative output may also be used in a servomechanism or drive apparatus where a rate signal is useful. At the same time, of course, the quantized output information supplied by the binary quantizer is available in the form of visual indication, or other form known in the art.

The binary quantizer of the present invention utilizes two techniques: a binary counting circuit that counts either forward or backward; and a circuit that synthesizes a voltage proportional to the count standing on the counter at any instant of time. These two features are combined in an apparatus whose numerical output is available on the register of the machine at all times and may be directly coupled to a digital computer which will perform the operations on these numbers. Since counting occurs only when required by a change in the instantaneous value of the input signal, the output of the binary quantizer "follows" the input signal as it changes at intervals depending on the rate of change of the input signal, the upper limit being the period of the master oscillator, which is four microseconds in the design described. Furthermore, increased digital accuracy in the form of more binary stages will not change the sampling rate.

While the counting circuits of the binary quantizer will operate at counting rates well in excess of five megacycles per second, a counting rate of 250 kc. per second was chosen in the specific embodiment shown to enable ordinary resistance-capacitance coupling circuits to be used throughout the feedback circuits. If such devices as inductive compensators and crystal diode coupling circuits are incorporated, and a careful placement of circuit components is made, greatly increased counting rates may be used affording more frequent sampling. For extremely low frequency input signals such as D. C. voltages, difference amplifiers may be used to combine the input signal with the feedback signal.

The use of this quantizer incorporating the advantages of the reversible counter and the feedback circuit may aid in the development of new approaches in the fields of analogue-digital computing, and servomechanisms.

The number of binary digits (one per stage) carried by a quantizer will determine the maximum number of discrete levels into which the input signal may be quantized. If the overall accuracy of the analogue computer is between one and two per cent, a quantizer employing five binary digits or stages (32 levels) would be satisfactory for use in this analogue computer.

As suggested in Fig. 1, the binary version of a varying quantity may be dequantized i. e. physically synthesized from the digital form by the feedback portion of the quantizer as follows:

If a binary number is applied to the leads 19, 29 etc. (normal output leads), the voltage then appearing on the feedback lead 47 will be a synthesis of the actual voltage represented by the varying binary number. As a matter of fact this is how the feedback works. It actually synthesizes the binary output for comparison purposes, as shown in Fig. 7 where a sine wave is synthesized from the binary data. Therefore, dequantizer 14 of Fig. 1 may comprise the feedback portion of Fig. 5 including leads 19, 29 etc. as input leads which energize feedback tubes 83, 83' etc. The outputs of the tubes 83, 83' et al. are added in resistor 84, and the synthesized or dequantized voltage then appears on lead 47. The leads 86 and 86' may be used as alternate input leads for the dequantizer.

Thus it is seen that the binary quantizer is a new device for translating a time-varying voltage into a binary number. Although well suited for computing work, this apparatus may find use wherever quantization of a continuously varying function is desired, as in pulse code modulators, automatic metering devices, and recording machines employing typed or printed numbers. Angular information may be transmitted in pulse form, by generating a voltage proportional to the angle, quantizing it, transmitting the counting pulses, and reproducing the information on a remote indicator.

Many changes may be made in the construction of the components of the system shown. For instance, various types of counters, gates and other circuits are possible without departing from the scope of the invention. It is intended that all matter contained in the above description or shown in the accompanying drawings shall be interpreted as illustrative and not in a limiting sense.

What is claimed is:

1. Means to quantize a varying voltage to produce a reversible output in digital form comprising counting means including a plurality of trigger circuits, switching means connecting said trigger circuits in cascade and arranged so that the trigger circuit may count in either direction, digital output means connected to each of said trigger circuits, digital multiplier means connected to said output means, and dequantizing means connected to said multiplier means.

2. Means to reproduce a varying quantity in digital form comprising a plurality of trigger circuits having two stable conditions, said trigger circuits being connected in series and arranged to operate as reversible counting means, feedback means connected to control said counting means, and means connected to said trigger circuits to supply the derivative of said varying quantity in pulse form.

3. Means to quantize a varying input quantity in digital form comprising reversible electronic counting means, feedback means connected to and adapted to control said counting means including means to compare said digital output with said input quantity and means to reverse the direction of counting, and means connected to said counting means to provide the derivative of said varying input quantity in polarized pulse form.

4. In an apparatus for quantizing a complex input wave, a binary counter comprising a plurality of bi-stable stages, the instantaneous stable state of each of said stages representing a binary digit, a pulse generator to actuate said counter, means for producing a signal correlated to the instantaneous total quantity represented by said counter, means to compare said input wave with said last-named signal, means to gate the pulses received by said bi-stable stages in response to the amplitude and sense of said comparison means output, and means responsive to the pulses received by said first bi-stable stage to produce synchronous output pulses polarized in accordance with the sense of said comparison means output, whereby the average energy level and polarity of said output pulses represent the derivative of said input wave.

5. In a apparatus for quantizing a complex input wave, a binary counter comprising a plurality of bi-stable stages, the instantaneous stable state of each of said stages representing a binary digit, a pulse generator to operate said counter, means for producing a signal correlated to the instantaneous total quantity represented by said counter, means to compare said input wave with said last-named signal, means to control the pulses received by said bi-stable stages in accordance with the amplitude and sense of said comparison means output, means to produce a positive pulse in response to each of said controlled pulses when said input signal is increasing, and means to produce a negative pulse in response to each of said controlled pulses when said input signal is decreasing, whereby the frequency and polarity of the composite output pulses of said two last-named means represent the derivative of said input signal.

6. In an apparatus for quantizing a complex input wave, a binary counter comprising a plurality of series-connected bi-stable stages, the instantaneous stable state of each of said stages representing a binary digit, a pulse generator connected to the first of said binary stages to operate said counter, means for producing a signal correlated to the instantaneous total quantity represented by said counter, means to compare said input wave with said last-named signal, means to control the number of pulses received by said first bi-stable stage in accordance with the amplitude of the output of said comparison means, means to control the interconnections between said bi-stable stages in accordance with the sense of the output of said comparison means, and means to produce a pulse in response to each pulse received by said first bi-stable stage, said means being operatively connected to said interconnection control means to polarize said pulses, whereby the frequency and polarity of the output pulses of said last-named means represent the derivative of said input signal.

7. In an apparatus for quantizing a complex input wave, a binary counter comprising a plurality of bi-stable stages serially arranged in dual connecting paths, the instantaneous stable state of each of said stages representing a binary digit, a pulse generator connected to the first of said stages, means for producing a signal correlated to the instantaneous total quantity represented by said plurality of stages, means to compare the input wave with said last-named signal, means responsive to a predetermined amplitude of output from said comparison means to gate said pulse generator in discrete pulses, means responsive to the sense of the output of said comparison means for controlling conduction through said dual interconnecting paths to increase or decrease said total binary quantization to match said input signal, means to produce negative and positive pulses in response to each gated pulse, and means connected to said interstage conduction controlling means to suppress one of said series of polarized pulses, whereby the frequency and polarity of the output pulses of said last-named means represent the derivative of said input wave.

References Cited in the file of this patent

UNITED STATES PATENTS

| | | |
|---|---|---|
| 2,306,386 | Hollywood | Dec. 29, 1942 |
| 2,428,990 | Rajchman | Oct. 14, 1947 |
| 2,437,707 | Pierce | Mar. 16, 1948 |
| 2,482,932 | Pyatt et al. | Sept. 17, 1949 |
| 2,537,427 | Seid et al. | Jan. 9, 1951 |
| 2,539,623 | Heising | Jan. 30, 1951 |
| 2,540,442 | Grosdoff | Feb. 6, 1951 |
| 2,623,115 | Woods-Hill et al. | Dec. 23, 1952 |

OTHER REFERENCES

"The Binary Quantizer" by Kay Howard Barney, November 1949, Issue of Electrical Engineering, pages 962 to 967.